United States Patent
Arimatsu (10) Patent No.: US 10,340,757 B2
(45) Date of Patent: Jul. 2, 2019

(54) ROTOR MEMBER, ROTOR AND ELECTRIC MOTOR

(71) Applicant: FANUC CORPORATION, Yamanashi (JP)

(72) Inventor: Youhei Arimatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 130 days.

(21) Appl. No.: 15/590,192

(22) Filed: May 9, 2017

(65) Prior Publication Data
US 2017/0366055 A1 Dec. 21, 2017

(30) Foreign Application Priority Data
Jun. 17, 2016 (JP) ................................. 2016-121088

(51) Int. Cl.
*H02K 1/27* (2006.01)
*H02K 1/30* (2006.01)
*H02K 15/03* (2006.01)

(52) U.S. Cl.
CPC ............ *H02K 1/274* (2013.01); *H02K 1/278* (2013.01); *H02K 1/30* (2013.01); *H02K 15/03* (2013.01)

(58) Field of Classification Search
CPC ... H02K 1/28; H02K 21/14; H02K 1/27; H02K 1/30; H02K 15/03; H02K 1/274; H02K 1/278
See application file for complete search history.

(56) References Cited

U.S. PATENT DOCUMENTS

| 4,633,113 A | * | 12/1986 | Patel | H02K 15/03 310/156.28 |
| 4,843,705 A | * | 7/1989 | Aussieker | H02K 1/28 29/598 |
| 4,855,630 A | * | 8/1989 | Cole | H02K 1/278 310/156.28 |
| 4,910,861 A | * | 3/1990 | Dohogne | H02K 1/278 264/272.2 |

(Continued)

FOREIGN PATENT DOCUMENTS

| JP | S59-056857 A | 4/1984 |
| JP | H11-107920 A | 4/1999 |

(Continued)

OTHER PUBLICATIONS

An Office Action; "Notification of Reasons for Refusal," issued by the Japanese Patent Office dated May 29, 2018, which corresponds to Japanese Patent Application No. 2016-121088 and is related to U.S. Appl. No. 15/590,192; with English language translation.

*Primary Examiner* — Naishadh N Desai
(74) *Attorney, Agent, or Firm* — Studebaker & Brackett PC (57) ABSTRACT

To provide a rotor member, rotor, and electric motor equipped with the same, which suppress the stress or stretching concentrated on a part of a cylindrical member, thereby enabling to raise the maximum revolution speed, and enabling greater torque to be obtained. In a rotor member fixed by press-fitting to a rotary shaft part of a rotating electrical machine, a thrust member that thrusts a cylindrical member to an outer side in the radial direction against a sleeve part is present between a plurality of magnet segments which are adjacent in the circumferential direction.

5 Claims, 5 Drawing Sheets

(56) References Cited

U.S. PATENT DOCUMENTS

| | | | | |
|---|---|---|---|---|
| 4,918,802 A * | 4/1990 | Schaefer | | H02K 1/278 29/598 |
| 4,922,144 A * | 5/1990 | Baker | | H02K 1/28 29/598 |
| 4,973,872 A * | 11/1990 | Dohogne | | H02K 1/278 310/156.23 |
| 6,047,461 A * | 4/2000 | Miura | | H02K 1/278 29/596 |
| 7,741,747 B2 * | 6/2010 | Yamamura | | H02K 1/278 310/156.01 |
| 2002/0079770 A1 * | 6/2002 | Lai | | H02K 1/278 310/156.28 |
| 2007/0138891 A1 * | 6/2007 | Hurst | | H02K 1/278 310/156.28 |
| 2009/0146517 A1 * | 6/2009 | Tresch | | H02K 1/278 310/156.28 |
| 2012/0326555 A1 * | 12/2012 | Arimatsu | | H02K 1/30 310/216.121 |
| 2013/0026862 A1 * | 1/2013 | Brandau | | H02K 1/278 310/43 |
| 2014/0300233 A1 * | 10/2014 | Arimatsu | | H02K 1/278 310/156.12 |
| 2016/0111926 A1 * | 4/2016 | Arimatsu | | H02K 1/2706 310/156.31 |
| 2016/0141931 A1 * | 5/2016 | Kawai | | H02K 1/30 310/156.12 |

FOREIGN PATENT DOCUMENTS

| | | | |
|---|---|---|---|
| JP | 2000-069696 A | | 3/2000 |
| JP | 2000-245086 A | | 9/2000 |
| JP | 2000245086 A | * | 9/2000 |
| JP | 2005-012870 A | | 1/2005 |
| JP | 2005-117732 A | | 4/2005 |
| JP | 2010-233325 A | | 10/2010 |
| JP | 2014-212680 A | | 11/2014 |
| WO | 2006/008964 A1 | | 1/2006 |

* cited by examiner

ROTOR MEMBER, ROTOR AND ELECTRIC MOTOR

This application is based on and claims the benefit of priority from Japanese Patent Application No. 2016-121088, filed on 17 Jun. 2016, the content of which is incorporated herein by reference.

BACKGROUND OF THE INVENTION

Field of the Invention

The present invention relates to a rotor member, a rotor and an electric motor, and in particular, relates to a rotor member constituting a magnet surface-bonded type electric motor, a rotor and an electric motor including these.

Related Art

The rotor member of a synchronous motor includes a cylindrical sleeve part; a plurality of magnet segments arranged so as to be aligned in the circumferential direction at the outer side in the radial direction of the sleeve part, and as a whole constituting a cylindrical magnet segment group; and a cylindrical member that covers the magnet segments from the outer side in the radial direction of the magnet segment group, and sandwiches the magnet segments with the sleeve part. The cylindrical member is constituted from carbon fiber reinforced plastic (CFRP), for example. The inner circumferential face of the sleeve part has a tapered face. In the space surrounded by the inner circumferential face of the sleeve part of such a rotor member, a rotary shaft part having a cylindrical shape is inserted by press fitting, whereby the rotor of the electric motor is configured (refer to Patent Document 1).

Patent Document 1: Japanese Unexamined Patent Application, Publication No. 2014-212680

SUMMARY OF THE INVENTION

In order to raise the maximum revolution speed of the synchronous motor described in the above-mentioned Patent Document 1, it is necessary to raise the holding strength (retaining force) of the cylindrical member serving as the magnet retaining member of the rotor outer circumference in order to prevent the magnet segments from flying off due to centrifugal force. With the above-mentioned Patent Document 1, tensile strength is increased by increasing the stretch of the cylindrical member, thereby raising the holding strength of the magnet segments.

However, with this method, tension is applied to the cylindrical member. At this time, the cylindrical member must be uniformly stretched with bias in the circumferential direction of the cylindrical member. However, in actual practice, in the course of the tension increasing along with the advancement of press-fitting of the rotor shaft part to the sleeve part, the friction force caused by the cylindrical member abutting concentrates on the corner-shaped portion of the end of the magnet segments in the circumferential direction of the magnet segment group, and it is considered that the stress from stretching concentrates on the portion of the cylindrical member between the plurality of magnet segments. In addition, the corner-shaped portion of the magnet segment forms a convex part, and by this portion abutting the cylindrical member, it is considered influence the cylindrical member due to the curvature of the cylindrical member becoming larger locally.

The present invention has an object of providing a rotor member, rotor, and electric motor equipped with the same, which suppress the stress or stretching concentrated on a part of the cylindrical member, thereby enabling to raise the maximum revolution speed, and enabling greater torque to be obtained.

According to a first aspect of the present invention, a rotor member (for example, the rotor member 300, 300A, 300B, 300C described later) that is fixed by press-fitting to a rotor shaft part (for example, the rotary shaft part 200 described later) of a rotating electrical machine (for example, 100), includes: a cylindrical sleeve part (for example, the sleeve part 301 described later) having a first end (for example, the first end 302 described later) at an axial-direction first side thereof, and a second end (for example, the second end 303 described later) at an axial-direction second side thereof; a plurality of magnet segments (for example, the magnet segment 311 described later) that are arranged to align in a circumferential direction at an outer side in the radial direction of the sleeve part; and a cylindrical member (for example, the cylindrical member 321, 321C described later) that covers the plurality of the magnet segments from an outer side in the radial direction, and sandwiches the plurality of the magnet segments with the sleeve part, in which an inner circumferential face of the sleeve part has a tapered face (for example, the tapered inner circumferential face 306 described later) that continuously expands towards the outer side in the radial direction as approaching the second end from the first end, and a thrust member (for example, the thrust member 330, 330A, 330B, 330C described later) that thrusts the cylindrical member to the outer side in the radial direction against the sleeve part is present between the plurality of the magnet segments which are adjacent in the circumferential direction.

According to a second aspect of the present invention, in the rotor member as described in the first aspect, the thrust member may be a member that contacts against the magnet segments on both sides which are adjacent in the circumferential direction, the sleeve part and the cylindrical member.

According to a third aspect of the present invention, in the rotor member as described in the first or second aspect, the thrust member may be a member having a portion that is sandwiched between a part on an outer side in the radial direction of the magnet segments on both sides which are adjacent in the circumferential direction, and the cylindrical member.

According to a fourth aspect of the present invention, a rotor includes the rotor member as described in any one of the first to third aspects. In addition, according to a fifth aspect of the present invention, an electric motor includes the rotor as described in the fourth aspect.

According to the present invention, it is possible to provide a rotor member, rotor, and electric motor equipped with the same, which suppress the stress or stretching concentrated on a part of the cylindrical member, thereby enabling to raise the maximum revolution speed, and enabling greater torque to be obtained.

DETAILED DESCRIPTION OF THE INVENTION

Figure 1:
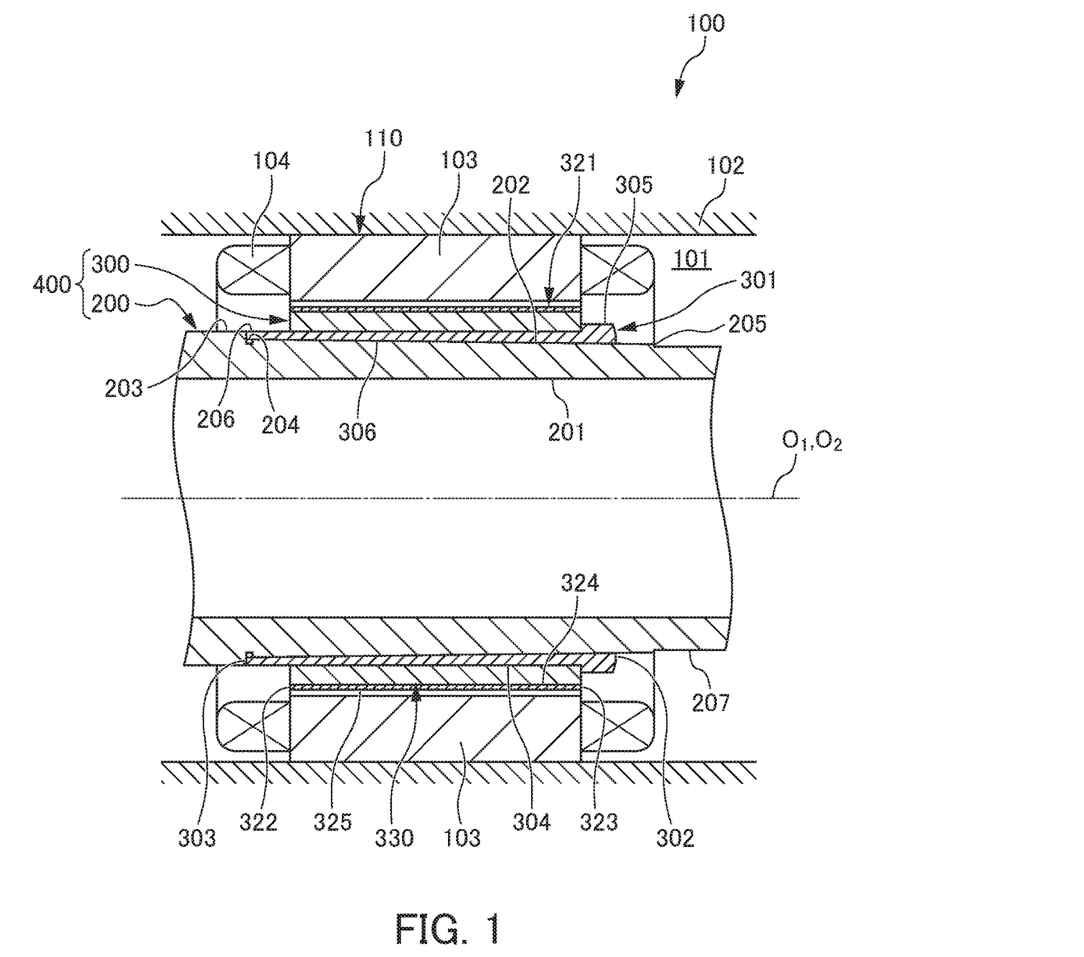
FIG. 1 is a cross-sectional view showing an electric motor 100 according to a first embodiment.
Figure 2:
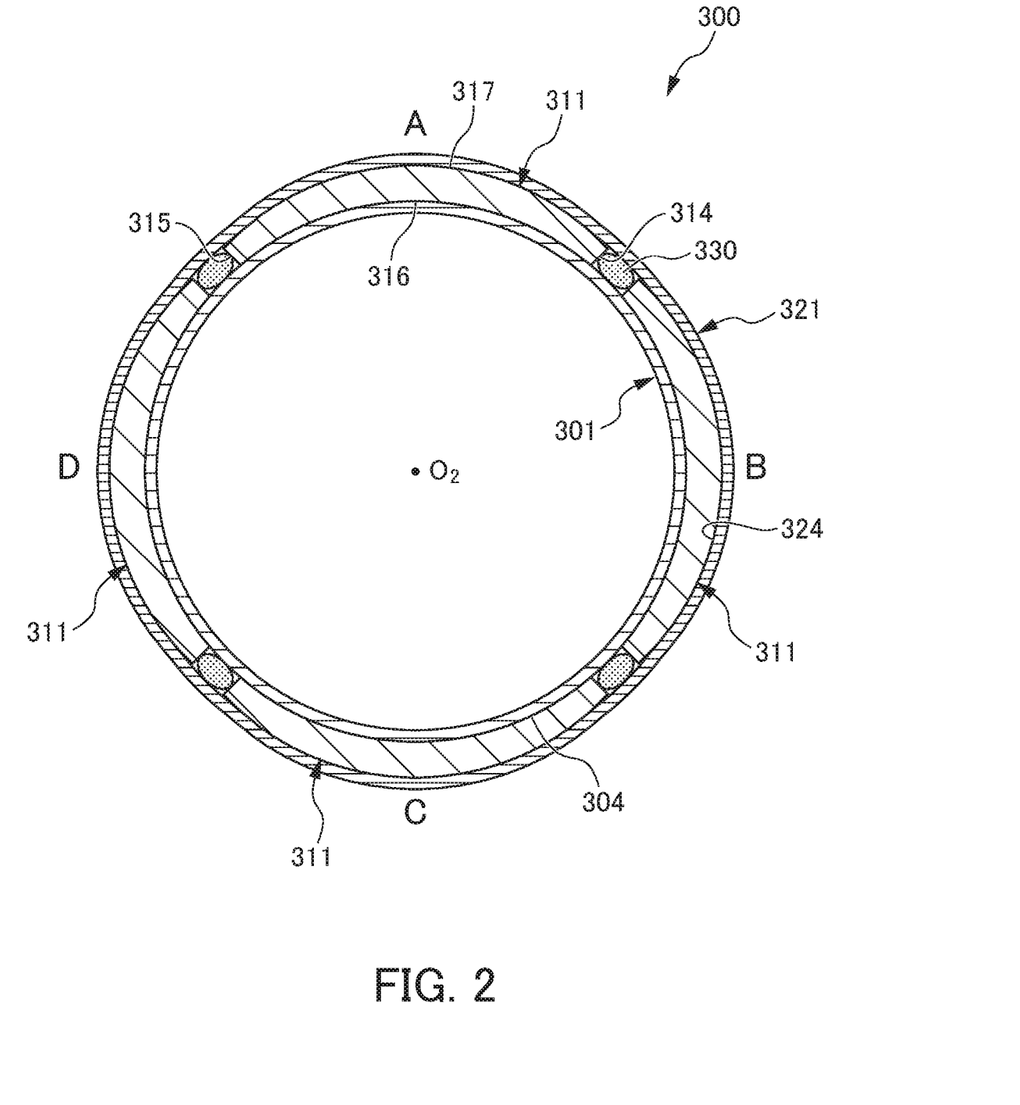
FIG. 2 is a cross-sectional view seen in an axial direction of a sleeve part 301, showing a rotor member 300 according to the first embodiment.
Figure 3:
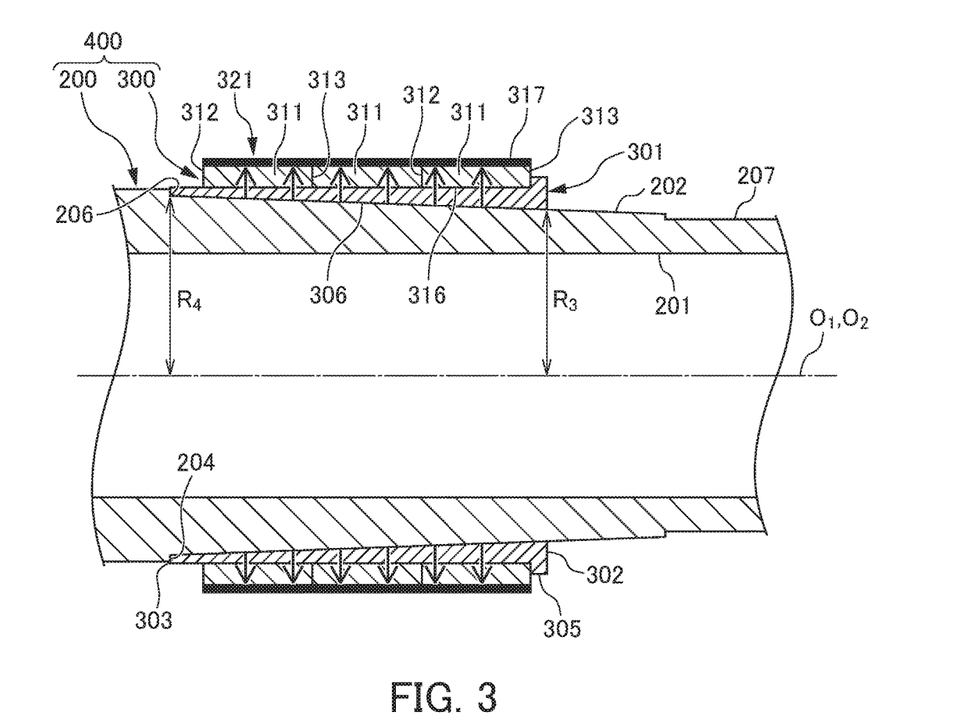
FIG. 3 is a cross-sectional view cut along the shaft center of the sleeve part 301, showing the rotor member 300 according to the first embodiment.
Figure 4:
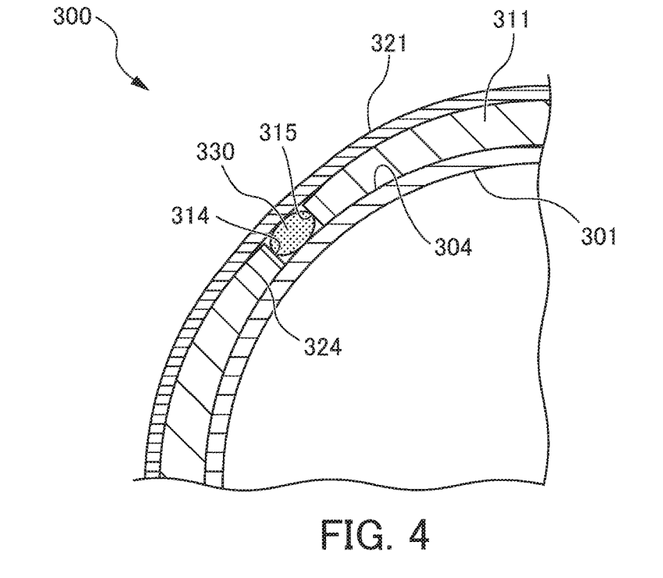
FIG. 4 is an enlarged cross-sectional view showing a thrust member 330 of the rotor member 300 according to the first embodiment.

Hereinafter, a first embodiment of the present invention will be explained. FIG. 1 is a cross-sectional view showing an electric motor 100 according to the first embodiment. FIG. 2 is a cross-sectional view seen along the axial direction of a sleeve part 301, showing a rotor member 300 according to the first embodiment. FIG. 3 is a cross-sectional view cutting along the shaft center of the sleeve part 301, showing the rotor member 300 according to the first embodiment. FIG. 4 is an enlarged cross-sectional view showing a thrust member 330 of the rotor member 300 according to the first embodiment. In the following explanation, for convenience in explanation, the direction along the shaft center of a rotary shaft part 200 of the electric motor 100 is defined as the axial direction, and in FIG. 1, the left direction is defined as forward in the axial direction, and right direction as rearward in the axial direction.

The electric motor 100 as a rotating electrical machine is configured by a synchronous motor, and includes a housing 102 that demarcates an internal space 101, a stator 110 that is arranged to be stationary in the internal space 101 of the housing 102, and a rotor 400 that is rotatably installed at an inner side in the radial direction of the stator 110. The stator 110 has a stator core 103, and a coil 104 wound around the stator core 103. The stator core 103 is produced by thin sheets of electromagnetic steel being laminated.

A power wire (not illustrated) electrically connected to the coil 104 is drawn from the stator 110. The power wire is connected to a power source (not illustrated) that is installed outside of the electric motor 100, via a through hole provided in the housing 102.

The rotor 400 has a rotary shaft part 200 that extends in the axial direction of the internal space 101, and a rotor member 300 that is fixed to the outer side in the radial direction of the rotary shaft part 200.

The rotary shaft part 200 is a cylindrical member having a shaft center (center axis line) $O_1$, and a center hole 201 that is concentric with the shaft center $O_1$, as shown in FIG. 3. In the present embodiment, due to assuming a built-in-motor used in the spindle of a machine tool, the center hole 201 is formed at the rotary shaft part 200; however, it is not limited thereto. The rotary shaft part 200 may be made with a solid member in which the center hole 201 is not formed.

The shaft center $O_1$ of the rotary shaft part 200 is the rotating shaft center of the electric motor 100. A portion on the forward side in the axial direction of the rotary shaft part 200 is rotatably supported by the housing 102, via a bearing (not illustrated) installed in a wall part on the forward side of the housing 102. Similarly, a portion on the rearward side in the axial direction of the rotary shaft part 200 is rotatably supported by the housing 102, via a bearing (not illustrated) installed in the wall part on the rearward side of the housing 102.

The rotary shaft part 200 has an outer circumferential face 202 of tapered shape that gradually expands to the outer side in the radial direction, as approaching the forward side in the axial direction of the rotary shaft part 200 from the rearward side in the axial direction. A portion 203 on the forward side in the axial direction of the rotary shaft part 200 and a stepped part 204 are provided for convenience during production. The tapered outer circumferential face 202 extends continuously from an axial-direction back end 205 to an axial-direction front end 206. The outer circumferential face 207 of the cylindrical shape extending linearly along the axial direction is formed rearward in the axial direction of the axial-direction back end 205 in the tapered outer circumferential face 202.

The thrust portion 203 and the stepped part 204 are formed in order to facilitate an assembly operation during production. The thrust portion 203 has an outer circumferential face of cylindrical shape extending along the axial direction, and projects from the tapered outer circumferential face 202 to an outer side in the radial direction of the rotary shaft part 200, so as to form the stepped part 204 with the axial-direction front end 206 of the tapered outer circumferential face 202.

As shown in FIG. 2, the rotor member 300 has a cylindrical sleeve part 301, a plurality of magnet segments 311 (refer to FIG. 3, etc.) which are arranged so as to align in the circumferential direction at the outer side in the radial direction of the sleeve part 301, and constitute a cylindrical magnet segment group as a whole, and a cylindrical member 321 which covers the magnet segments 311 from the outer side in the radial direction. The magnet segment 311 may be divided into a plurality in the axial direction according to the convenience of manufacture or convenience of molding of magnets, and in the present embodiment, are divided into three in the axial direction, as shown in FIG. 3.

As shown in FIGS. 1, 3, etc., the sleeve part 301 is a cylindrical member having the central shaft line $O_2$. The sleeve part 301 has a first end 302 at the rearward side in the axial direction as an axial-direction first side, a second end 303 at the forward side in the axial direction as an axial-direction second side, and an outer circumferential face 304 of cylindrical shape extending along the axial direction. A convex part 305 at the back end in the axial direction of the sleeve part 301 that projects to the outer side in the radial direction from the outer circumferential face 304 is formed in order to facilitate aligning the position in the axial direction of magnets upon production.

The sleeve part 301 is prepared from metallic material that is a magnetic substance, like SS400 or S45C, for example. In addition, the thickness of the sleeve part 301 in the radial direction of the sleeve part 301 is preferably thinner in order to simplify the work to press-fit the sleeve part 301 into the rotary shaft part 200. For example, the sleeve part 301 has a thickness of 1 mm to 2 mm at a portion at which the thickness is thinnest.

In the present embodiment, the sleeve part 301 has a tapered inner circumferential face 306 as a tapered face that expands continuously to the outer side in the radial direction, as approaching the second end 303 from the first end 302. The tapered inner circumferential face 306 extends continuously from the first end 302 until the second end 303, and does not include a portion in which the radius thereof becomes smaller in a direction from the first end 302 towards the second end 303 as axial-direction forward direction. In other words, in the tapered inner circumferential face 306, the radius thereof gradually increases as approaching forward in the axial direction, over the entire region from the first end 302 until the second end 303, and no portion exists in which the radius of the tapered inner circumferential face 306 becomes smaller locally, in a midway portion from the first end 302 until the second end 303.

In the electric motor 100, the sleeve part 301 is fixed on the tapered outer circumferential face 202 of the rotary shaft part 200 by interference fitting, so that the central axis line O1 of the rotary shaft part 200 and the central axis line O2 of the sleeve part 301 match. Then, as shown in FIG. 1, the second end 303 of the sleeve part 301 and the stepped part 204 of the thrust portion 203 abut. The radius R4 of the tapered inner circumferential face 306 at the second end 303 and the radius of the tapered outer circumferential face 202 at the axial-direction front end 206 are substantially equal. The tapered inner circumferential face 306 of the sleeve part 301 and the tapered outer circumferential face 202 of the rotary shaft part 200 closely attach together with great surface pressure. The sleeve part 301 is being pressed towards the outer side in the radial direction by the rotary shaft part 200, as shown by the arrow in FIG. 3.

The magnet segment 311 is configured by substantially arc-shaped magnet piece having an inside diameter of a predetermined radius of curvature. More specifically, the magnet segment 311 has an end face 312 at the forward side in the axial direction and end face 313 at the rearward side in the axial direction; an end face 314 at one side in the circumferential direction of the magnet segment group, and an end face 315 at the other side in the circumferential direction of the magnet segment group; and an inner circumferential face 316 at the inner side in the radial direction, and an outer circumferential face 317 at the outer side in the radial direction, as shown in FIGS. 2, 3, etc.

The inner circumferential face 316 is an arc face having a predetermined radius of curvature, and extends along the axial direction so as to connect a side forming the end face 312 which is at the inner side in the radial direction of the magnet segment group, and a side forming the end face 313, which is at the inner side in the radial direction of the magnet segment group. The outer circumferential face 317 is configured by a smooth curved line extending along the circumferential direction of the magnet segment group. A portion at an end of the magnet segment 311 in the circumferential direction of the magnet segment group is configured with thinning thickness as approaching the edge, so that the outer circumferential face 317 approaches the inner circumferential face 316, as shown in FIG. 4, etc.

As shown in FIGS. 1 and 2, the cylindrical member 321 is a member of cylindrical shape having a form that extends in the axial direction. More specifically, the cylindrical member 321 has an end face 322 at the axial-direction forward side, an end face 323 at the axial-direction rearward side, and cylindrical inner circumferential face 324 and outer circumferential face 325. The cylindrical member 321 does not have a perfectly circular cylindrical shape, but rather has a non-circular cylindrical shape in which the radius becomes smaller compared to other portions of the cylindrical member 321, as shown in FIG. 2, etc., at a portion facing the space between a plurality of magnet segments 311 which are adjacent in the circumferential direction of the magnet segment group, and the vicinity thereof.

The cylindrical member 321 is able to slightly stretch in the circumferential direction of the cylindrical member 321, has high strength relative to deformation that would swell toward the outer side in the radial direction, and thus the radius (diameter) of the cylindrical member 321 hardly changes. In addition, the cylindrical member 321 is preferably manufactured from a non-magnetic material from the viewpoint of preventing heat generation from magnetic flux and a performance decline due to leakage of magnetic flux. Furthermore, the cylindrical member 321 preferably has low density in order to lower the centrifugal force produced from rotation.

For example, as the material of the cylindrical member 321, materials superior in specific strength (tensile strength per unit density) are ideal such as carbon fiber, glass fiber, aramid fiber, silicon carbide fiber, boron fiber, titanium alloy fiber, ultrahigh molecular weight polyethylene fiber, or polybutylene terephthalate fiber are ideal. In addition, as the material of the cylindrical member 321, FRP (fiber reinforced resin) made using carbon fiber, glass fiber, aramid fiber, silicon carbide fiber, boron fiber, titanium alloy fiber, ultrahigh molecular weight polyethylene fiber, or polybutylene terephthalate fiber, or a composition made by combining several of these are also ideal. In addition, as the material of the cylindrical member 321, a non-magnetic metal such as Austenitic stainless steel, titanium, or titanium alloy may be used. In the present embodiment, CFRP (carbon fiber reinforced resin) is used as the material of the cylindrical member 321.

As is evident from FIGS. 2 and 3, a total of twelve of the magnet segments 311 are arranged in the rotor member 300. More specifically, in the circumferential direction position indicated by A in FIG. 2, three of the magnet segments 311 are arranged so as to adjoin each other in the axial direction. Similarly, at the circumferential direction positions indicated by B, C and D in FIG. 2, three magnet segments 311 are arranged so as to adjoin each other in the axial direction, respectively.

In this way, in the rotor member 300 according to the present embodiment, six pairs of magnet segments 311 are disposed so as to be arranged at substantially equal intervals in the circumferential direction of the sleeve part 301, on the outer circumferential face 304 of the sleeve part 301. Each of the magnet segments 311 positioned at the axial-direction rearward side is arranged to align positions in the axial direction, by a structure such as the convex part 305 being provided to the sleeve part 301, for example, as shown in FIG. 1, etc.

At the outer side in the radial direction of six pairs of, for a total of twelve, magnet segments 311 in the circumferential direction of the sleeve part 301, the cylindrical member 321 is provided so as to cover as well as tighten the entirety of the magnet segments 311 from the outer side in the radial direction of the sleeve part 301. Herein, as mentioned above, the sleeve part 301 is pressed towards the outer side in the radial direction as shown by the arrow in FIG. 3 by the rotary shaft part 200, in the electric motor 100 as shown in FIG. 1. By way of this pressing, the sleeve part 301 tries to deform to the outer side in the radial direction, and presses each of the magnet segments 311 towards the outer side in the radial direction.

In contrast, the cylindrical member 321 has high strength against deformation that would swell towards the outer side in the radial direction, as mentioned above. Therefore, the stress imparted from the magnet segments 311 is accepted by the tension of the cylindrical member 321 produced in the circumferential direction of the cylindrical member 321, and as the reaction force thereof, the magnet segment 311 is pushed back towards the inner side in the radial direction.

For this reason, the magnet segment 311 is firmly sandwiched between the sleeve part 301 and the cylindrical member 321. Even in a case of the rotor member 300 rotating at high speed during driving of the electric motor 100, the magnet segments 311 will thereby be suppressed from relatively moving in relation to the sleeve part 301 and cylindrical member 321.

The thrust member 330 that supports the cylindrical member 321 relative to the sleeve 301 by way of thrusting to the outer side in the radial direction of the sleeve part 301 is present in the space between a plurality of magnet segments 311 which are adjacent in the circumferential direction of the magnet segment group. The thrust member 330 is configured from a non-magnetic material that has elasticity and is light weight, e.g., resin, rubber, titanium, aluminum, etc., and is configured from resin in the present embodiment.

As shown in FIG. 4, the thrust member 330 has a solid, elliptical shape in a cross-section orthogonal to the axial direction of the sleeve part 301, and extends from the first end 302 until the second end 303 in the axial direction of the sleeve part 301. In the thrust member 330, in a state in which external force is not acting from outside of the thrust member 330, the length of the thrust member 330 is longer than the distance between adjacent magnet segments 311 in the circumferential direction of the magnet segment group, and the length of the thrust member 330 (thickness) is longer than the distance between the inner circumferential face 324 of the cylindrical member 321 and the outer circumferential face 304 of the sleeve part 301, in the radial direction of the sleeve part 301 and cylindrical member 321. For this reason, the thrust member 330 contacts each of the end faces 314, 315 of the magnet segments 311 that are adjacent on both sides in the circumferential direction of the magnet segment group, the outer circumferential face 304 of the sleeve part 301, and the inner circumferential face 324 of the cylindrical member 321, in a state being compressed and elastically deformed in the circumferential direction of the magnet segment group and the radial direction of the sleeve part 301 and cylindrical member 321, as shown in FIG. 2.

For this reason, the thrust member 330 is thrusting by making so as to push the cylindrical member 321 to the outer side in the radial direction of the cylindrical member 321 against the sleeve part 301. The portion of the cylindrical member 321 supported by the thrust member 330 projects to the outer side in the radial direction of the cylindrical member 321, and the cylindrical member 321 assumes a non-cylindrical shape, rather than a cylindrical shape. Furthermore, as mentioned previous, the portion of the end of the magnet segment 311 in the circumferential direction of the magnet segment group is configured so that the thickness becomes thinner as approaching the edge (end face 314, or end face 315), so that the outer circumferential face 317 approaches the inner circumferential face 316, as shown in FIG. 4, etc.; therefore, the inner circumferential face of the cylindrical member 321 is separated to slightly rise to the outer side in the radial direction of the cylindrical member 321, relative to a portion of the end of the magnet segment 311 (including corner portion of the end) in the circumferential direction of the magnet segment group.

Next, operation of the electric motor 100 will be explained by referencing FIGS. 1, 2, etc. When current flows to the coil 104 from the power source installed outside of the electric motor 100 via a power line, a rotating field is generated around the shaft center $O_1$ by the rotor 110. The magnet segment 311 of the rotor member 300 receives the electromagnetic force in the circumferential direction of the magnet segment by way of the rotating field generated by the rotor 110. As a result thereof, the rotor member 300 rotates integrally with the rotor shaft part 200.

In the above way, according to the present embodiment, the rotor member 300 fixed by press fitting to the rotary shaft part 200 of the electric motor 100 serving as a rotating electrical machine includes: the cylindrical sleeve part 301 having a first end 302 on an axial-direction first side and a second end 303 at an axial-direction second side; a plurality of the magnet segments 311 arranged so as to align in the circumferential direction at an outer side in the radial direction of the sleeve part 301, and as a whole constituting the cylindrical magnet segment group; and the cylindrical member 321 that covers the plurality of magnet segments 311 from the outer side in the radial direction, and sandwiches the plurality of magnet segments 311 with the sleeve part 301. The inner circumferential face of the sleeve part 301 has a tapered inner circumferential face 306 as a tapered face that continuously expands towards the outer side in the radial direction as approaching towards the second end 303 from the first end 302, and the thrust member 330 thrusting the cylindrical member 321 to the outer side in the radial direction of the cylindrical member 321 against the sleeve part 301 is present between a plurality of the magnet segments 311 which are adjacent in the circumferential direction of the magnet segment group.

It thereby becomes possible for the inner circumferential face of the cylindrical member 321 to enter a state separated from the corner of the end of the magnet segment 311 in the circumferential direction of the magnet segment group. In the case of the cylindrical member 321 having a non-cylindrical shape as in the present embodiment, it is thereby possible to suppress the inner circumferential face of the cylindrical member 321 and the corner of this end of the magnet segment 311 from abutting, and thus mitigate stress concentration from this abutting from generating at the cylindrical member 321. As a result thereof, it is possible to suppress the cylindrical member 321 from locally stretching in the circumferential direction of the cylindrical member 321, between a plurality of magnet segments 311. For this reason, it becomes possible to obtain higher tension according to the stretch in the circumferential direction of the cylindrical member 321, further approaching uniformity overall of the cylindrical member 321, whereby it is possible to raise the maximum revolution speed of the electric motor 100. In addition, thicker, stronger magnet segments 311 have greater centrifugal force due to being heavier, and higher tension is required even at the same revolution speed; however, since it is possible to cope with this, a torque increase and output increase can be achieved without lowering the maximum revolution speed of the electric motor 100. Then, it becomes possible to achieve the aforementioned such performance improvements of the electric motor 100, as well as the occurrence of detaching of the outer circumferential face of the cylindrical member 321 being also suppressed, and thus the reliability and durability can be improved. In addition, the carbon fiber reinforced plastic (CFRP) constituting the cylindrical member 321 in the present embodiment is strong against pulling, but weak against bending. For this reason, the matter of avoiding a structure in which bending concentrates on the cylindrical member 321 abutting an end of the magnet segment 311 in the aforementioned way is particular advantageous in a case of using CFRP as the material of the cylindrical member 321.

In addition, the thrust member 330 is a member contacting against magnet segments 311 on both sides that are adjacent in the circumferential direction of the magnet segment group, the sleeve part 301 and the cylindrical member 321. By sandwiching the thrust member 330 that contacts against both magnet segments 311 on both sides that are adjacent in the circumferential direction of the magnet segment group, the cylindrical member 321 and the sleeve part 301, it is thereby possible to reliably avoid the cylindrical member 321 from contacting the end of the magnet segment 311 in the circumferential direction of the magnet segment group. It is thereby possible to reliably avoid a problem in the stress concentrating on the cylindrical member 321 at the end of the magnet segment 311. In addition, by the thrust member 330 contacting against each of the magnet segments 311 that are adjacent in the circumferential direction of the magnet segment group, it is possible to position the thrust member 330 at the center between magnet segments 311.

In addition, for example, a structure for keeping the interval between magnets constant is disclosed in Japanese Unexamined Patent Application, Publication No. H11-107920. However, in the same publication, there is no description relating to the avoidance of stress concentration to the side of a retaining member caused by the magnet edges. In addition, the concept of thrusting to lift up the retaining member is not described. Consequently, it would be impossible for a person skilled in the art to conceive the above-mentioned embodiment based on this publication.

In addition, Japanese Unexamined Patent Application, Publication No. S59-056857 describes an invention for obtaining an electric motor with good mechanical efficiency, by combining a magnetic body and non-magnetic body. In the same publication, there are absolutely no related descriptions for stress concentration avoidance at the side of the retaining member by the magnet end, or a configuration made intending unification of the tension on the retaining member, such as in the above-mentioned embodiment. Consequently, it would be impossible for a person skilled in the art to conceive the above-mentioned embodiment based on this publication.

In addition, Japanese Unexamined Patent Application, Publication No. 2010-233325 has the object of a magnetic body capable of adjusting magnetic flux, and adjustment of cogging torque. However, the above-mentioned embodiment has entirely no relation to the adjustment of magnetic flux or the adjustment of cogging torque. Due to the targeted functional effects being completely different in this way, it would be impossible for a person skilled in the art to conceive the above-mentioned embodiment based on this publication.

In addition, cylindrical magnets are high cost, and split magnets require labor for positioning, and thus the invention described in Japanese Unexamined Patent Application, Publication No. 2005-012870 is an invention aiming at a functional effect of adhering members with a positioning purpose in order to resolve these issues. From a functional effect brought about by a structure with the object of positioning, a person skilled in the art could not have conceived a configuration that suppresses stress concentration on the cylindrical member 321, as in the above-mentioned embodiment.

In addition, Japanese Unexamined Patent Application, Publication No. 2000-069696 describes a configuration that covers a rotor with a casing in order to prevent dust generation from the rotor, and fills resin between magnets. In other words, it only simply covers the rotor with a case, and simply fills resin between magnets. Based on the same publication, it would be impossible for a person skilled in the art to arrive at a concept such as supporting the cylindrical member 321 in a state thrusting against the sleeve part 301 with the object of suppressing the stress acting on the cylindrical member 321.

Figure 5:
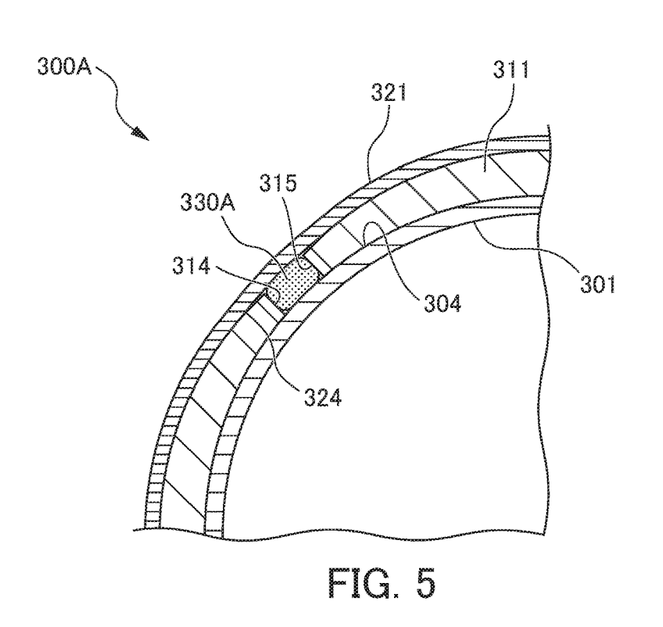
FIG. 5 is an enlarged cross-sectional view showing a thrust member 330A of a rotor member 300A according to a second embodiment.

Next, a rotor member according to a second embodiment of the present invention will be explained while referencing FIG. 5. FIG. 5 is an enlarged cross-sectional view showing a thrust member 330A of a rotor member 300A according to the second embodiment.

In the rotor member 300A according to the second embodiment, the thrust member 330A differs from the thrust member 300 according to the first embodiment. Since the configuration other than this is similar to the configuration of the rotor member 300 according to the first embodiment, a similar reference symbol is assigned for configurations similar to the respective configurations of the first embodiment, and explanations thereof are omitted.

As shown in FIG. 5, the thrust member 330A has a solid, substantially rectangular shape in a cross-section orthogonal to the axial direction of the sleeve part 301, and extends from the first end 302 until the second end 303 in the axial direction of the sleeve part 301. For the thrust member 330A, in a state in which an external force is not acting from outside of the thrust member 330A, the length of the thrust member 330A is longer than the distance between adjacent magnet segments 311 in the circumferential direction of the magnet segment group, and the length of the thrust member 330A (thickness) is longer than the distance between the inner circumferential face of the cylindrical member 321 and the outer circumferential face of the sleeve part 301 in the radial direction of the sleeve part 301 and cylindrical member 321. For this reason, the thrust member 330A contacts against each of the end faces of magnet segments 311 on both sides adjacent in the circumferential direction of the magnet segment group, the outer circumferential face 304 of the sleeve part 301, and the inner circumferential face 324 of the cylindrical member 321, in a state being compressed and elastically deformed in the circumferential direction of the magnet segment group and the radial direction of the sleeve part 301 and cylindrical member, as shown in FIG. 5.

For this reason, the thrust member 330A thrusts the cylindrical member 321 against the sleeve part 301 so as to push to the outer side in the radial direction of the cylindrical member 321. The portion of the cylindrical member 321 being supported by the thrust member 330A projects to the outer side of the cylindrical member 321, and the cylindrical member 321 assumes a non-cylindrical shape, rather than a cylindrical shape. Furthermore, as mentioned previously, the portion of the end of the magnet segment 311 in the circumferential direction of the magnet segment group is configured so that the thickness becomes thinner as approaching the edge (end face 314, or end face 315), so that the outer circumferential face 317 approaches the inner circumferential face 316, as shown in FIG. 5, etc.; therefore, the inner circumferential face of the cylindrical member 321 is separated to rise to the outer side in the radial direction of the cylindrical member 321, relative to a portion of the end of the magnet segment 311 (including corner portion of the end) in the circumferential direction of the magnet segment group.

Figure 6:
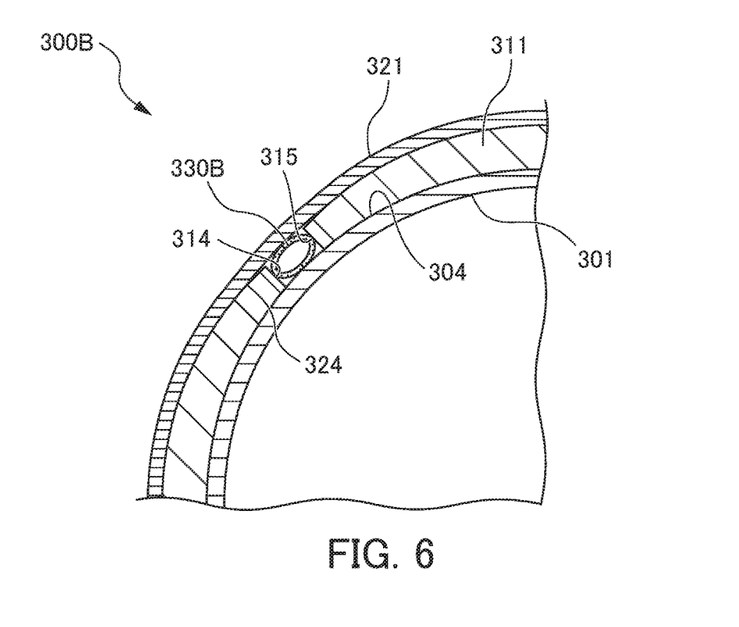
FIG. 6 is an enlarged cross-sectional view showing a thrust member 330B of a rotor member 300B according to a third embodiment.

Next, a rotor member according to a third embodiment of the present invention will be explained while referencing FIG. 6. FIG. 6 is an enlarged cross-sectional view showing a thrust member 330B of a rotor member 300B according to the third embodiment.

In the rotor member 300B according to the third embodiment, the thrust member 330B differs from the thrust member 330 according to the first embodiment. Since the configuration other than this is similar to the configuration of the rotor member 300 according to the first embodiment, a similar reference symbol is assigned for configurations similar to the respective configurations of the first embodiment, and explanations thereof are omitted.

As shown in FIG. 6, the thrust member 330B has a solid, elliptical shape, in a cross-section orthogonal to the axial direction of the sleeve part 301, and extends from the first end 302 until the second end 303 in the axial direction of the sleeve part 301.

Figure 7:
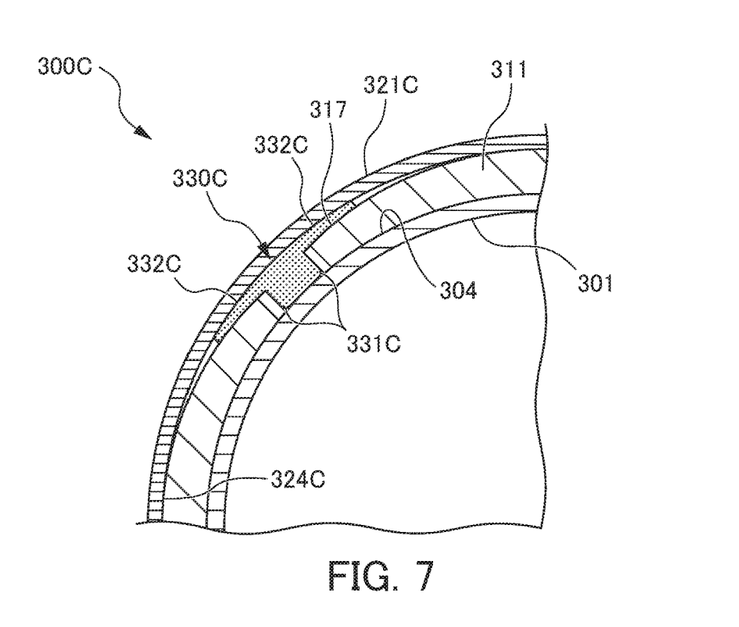
FIG. 7 is an enlarged cross-sectional view showing a thrust member 330C of a rotor member 300C according to a fourth embodiment.

Next, a rotor member according to a fourth embodiment of the present invention will be explained while referencing FIG. 7. FIG. 7 is an enlarged cross-sectional view showing a thrust member 330C of a rotor member 300C according to the fourth embodiment.

In the rotor member 300C according to the fourth embodiment, the thrust member 330C differs from the thrust member 330A according to the second embodiment. In addition, a cylindrical member 321C differs from the cylindrical member 321 according to the first to third embodiments. Since the configuration other than this is similar to the configuration of the rotor member 300A according to the second embodiment, a similar reference symbol is assigned for configurations similar to the respective configurations of the second embodiment, and explanations thereof are omitted.

The cylindrical member 321C has a perfectly circular cylindrical shape with the inside diameter and outside diameter thereof constant, respectively, in an axial-direction segment from an axial-direction forward end face until an axial-direction rearward end face of the cylindrical member 321C (corresponding to axial-direction forward end face 322 until axial-direction rearward end face 323 of the cylindrical member 321). The inside diameter of the cylindrical member 321C is equal to a value arrived at by subtracting, from the diameter of the rotor 400 passing through the thickest portion of the magnet segment 311 in the radial direction of the magnet segment group, the thickness of the cylindrical member 321C at one end side of this diameter and the thickness of the cylindrical member 321C at the other end side of this diameter.

The thrust member 330C is a member having a portion sandwiched between the cylindrical member 321C and parts of the magnet segments 311 on both sides adjacent in the circumferential direction of the magnet segment group at an outer side in the radial direction of the magnet segment group. More specifically, as shown in FIG. 7, the thrust member 330C has a rectangular part 331C of solid, rectangular shape in a cross-section orthogonal to the axial direction of the sleeve part 301, and a gap insertion part 332C penetrating between the outer circumferential face 317 of the magnet segment 311 and the inner circumferential face 324C of the cylindrical member 321C, and these are configured by integrally molding. The thrust member 330C extends from the first end 302 until the second end 303 in the axial direction of the sleeve part 301.

The rectangular part 331C has the same configuration as the thrust member 330A in the second embodiment. The gap insertion part 332C penetrates between the outer circumferential face 317 of the magnet segment 311 and the inner circumferential face 324C of the cylindrical member 321C in the circumferential direction of the magnet segment group from the rectangular part 331C, and reaches a predetermined position in the same direction. The gap insertion part 332C thereby supports the cylindrical member 321C against the magnet segment 311 towards the outer side in the radial direction of the cylindrical member 321C.

In the above way, according to the present embodiment, the thrust member 330C is a member having a portion that is sandwiched between the cylindrical member 321C and the outer cylindrical face 317, which is a part of the magnet segments 311 on both sides adjacent in the circumferential direction of the magnet segment group at the outer side in the radial direction of the magnet segment group. It is thereby possible to support by way of thrusting the inner circumferential face 324C of the cylindrical member 321C against the outer circumferential face of the magnet segment 311 towards the outer side in the radial direction of the cylindrical member 321C. As a result thereof, it becomes possible to make the cylindrical member 321C as a configuration having a perfectly circular cylindrical shape in which the inside diameter and outside diameter are respectively constant. For this reason, it becomes possible to make a configuration in which the cylindrical member 321C stretches uniformly in the circumferential direction of the cylindrical member 321C. In addition, production of the cylindrical member 321C becomes simple.

Although embodiments of the present invention have been explained above, the present invention is not to be limited to the aforementioned embodiments. In addition, the effects described in the present embodiments are merely listing the most preferred effects produced from the present invention, and the effects according to the present invention are not to be limited to those described in the present embodiments.

For example, the configurations of the rotor member, the rotor and the electric motor having these are not limited to the configurations of the rotor member 300, 300A, 300B, 300C, the rotor 400 and the electric motor 100 having these of the present embodiments. For example, although twelve of the magnet segments 311 are provided, it is not limited to this number. In addition, the configuration of the thrust member is not limited to the configurations of the thrust members 330, 330C of the present embodiments.

EXPLANATION OF REFERENCE NUMERALS

100 electric motor (rotating electrical machine)
200 rotary shaft part
300, 300A, 300B, 300C rotor member
301 sleeve part
302 first end
303 second end
306 tapered inner circumferential face
311 magnet segment
321, 321C cylindrical member
330, 330A, 330B, 330C thrust member
400 rotor

What is claimed is:

1. A rotor member that is fixed by press-fitting to a rotary shaft part of a rotating electrical machine, comprising:
   a cylindrical sleeve part having a first end at an axial-direction first side thereof, and a second end at an axial-direction second side thereof;
   a plurality of magnet segments that are arranged to align in a circumferential direction at an outer side in the radial direction of the sleeve part; and
   a cylindrical member that covers the plurality of the magnet segments from an outer side in the radial direction, and sandwiches the plurality of the magnet segments with the sleeve part, wherein
   an inner circumferential face of the sleeve part has a tapered face that continuously expands towards the outer side in the radial direction as approaching the second end from the first end, and wherein a thrust member that thrusts the cylindrical member to the outer side in the radial direction against the sleeve part is present between the plurality of the magnet segments which are adjacent in the circumferential direction, wherein the thrust member thrusts the cylindrical member to the outer side in the radial direction such that a gap is formed between an inner circumferential face of the cylindrical member and a radially outer corner of each magnet segment that is directly adjacent to the thrust member in the circumferential direction, the radially outer corner of each magnet segment being the radially outer corner directly adjacent to the thrust member in the circumferential direction.

2. The rotor member according to claim 1, wherein the thrust member is a member that contacts against the magnet segments on both sides which are adjacent in the circumferential direction, the sleeve part and the cylindrical member.

3. The rotor member according to claim 1, wherein the thrust member is a member having a portion that is sandwiched between a part on an outer side in the radial direction of the magnet segments on both sides which are adjacent in the circumferential direction, and the cylindrical member.

4. A rotor comprising the rotor member according to claim 1.

5. An electric motor comprising the rotor according to claim 4.

* * * * *